US006575528B2

(12) United States Patent  
Tiesler et al.

(10) Patent No.: US 6,575,528 B2
(45) Date of Patent: Jun. 10, 2003

(54) MODULAR OVERHEAD CONSOLE ASSEMBLY

(75) Inventors: John M. Tiesler, Harrison Township, MI (US); Alan Sturt, West Bloomfield, MI (US); Tracy L. Simpson, Ferndale, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/038,258

(22) Filed: Oct. 19, 2001

(65) Prior Publication Data

US 2003/0075955 A1 Apr. 24, 2003

(51) Int. Cl.[7] ................. B60J 7/00; B60N 3/12
(52) U.S. Cl. ............... 296/214; 296/37.7; 296/37.8
(58) Field of Search .................. 296/214, 37.7, 296/37.8; 224/311; 348/837; 280/735; 362/488

(56) References Cited

U.S. PATENT DOCUMENTS

| 3,917,207 | A |   | 11/1975 | Quigley |  |
|---|---|---|---|---|---|
| 4,241,870 | A | * | 12/1980 | Marcus | 296/37.7 |
| 4,469,365 | A | * | 9/1984 | Marcus et al. | 296/37.7 |
| 4,738,481 | A |   | 4/1988 | Watjer et al. |  |
| 4,783,110 | A | * | 11/1988 | Beukema et al. | 296/37.7 |
| 4,867,498 | A | * | 9/1989 | Delphia et al. | 296/37.7 |
| 4,893,866 | A | * | 1/1990 | Dowd et al. | 296/214 |
| 4,941,718 | A | * | 7/1990 | Alexander et al. | 296/37.7 |
| 5,020,845 | A |   | 6/1991 | Falcoff et al. |  |
| 5,040,990 | A |   | 8/1991 | Suman et al. |  |
| 5,050,922 | A | * | 9/1991 | Falcoff | 296/37.7 |
| 5,154,617 | A |   | 10/1992 | Suman et al. |  |
| 5,186,517 | A |   | 2/1993 | Gilmore et al. |  |
| 5,403,058 | A | * | 4/1995 | Fischer | 296/37.7 |
| 5,522,638 | A |   | 6/1996 | Falcoff et al. |  |
| 5,667,896 | A |   | 9/1997 | Carter et al. |  |
| 5,822,023 | A | * | 10/1998 | Suman et al. | 348/837 |
| 5,873,597 | A | * | 2/1999 | Sim | 280/735 |
| 5,887,929 | A | * | 3/1999 | Miller et al. | 296/37.7 |
| 5,887,939 | A |   | 3/1999 | Yamaguchi et al. |  |
| 5,927,784 | A | * | 7/1999 | Vitito | 296/37.7 |
| 6,003,925 | A | * | 12/1999 | Litke et al. | 296/37.7 |
| 6,019,411 | A |   | 2/2000 | Carter et al. |  |
| 6,065,793 | A |   | 5/2000 | Koshida et al. |  |
| 6,076,885 | A | * | 6/2000 | Curtindale et al. | 296/214 |
| 6,115,086 | A | * | 9/2000 | Rosen | 296/37.7 |
| 6,116,675 | A | * | 9/2000 | Iwasawa | 296/37.7 |
| 6,125,030 | A | * | 9/2000 | Mola et al. | 296/37.8 |
| 6,126,221 | A |   | 10/2000 | Kern |  |
| 6,135,528 | A | * | 10/2000 | Sobieski et al. | 296/37.7 |
| 6,176,536 | B1 |   | 1/2001 | Miller et al. |  |
| 6,257,745 | B1 | * | 7/2001 | Speth et al. | 362/488 |
| 6,273,499 | B1 | * | 8/2001 | Guyon | 296/214 |
| 6,338,517 | B1 | * | 1/2002 | Canni et al. | 296/37.8 |
| 2002/0163219 | A1 | * | 11/2002 | Clark et al. | 296/37.8 |

FOREIGN PATENT DOCUMENTS

DE  198 22 638     * 12/1999
DE  198 22 638 C2   6/2000

OTHER PUBLICATIONS

Abstract Corresponding To DE 198 22 638 C2.
Patent Abstracts Of Japan, 11192892 A.
Patent Abstracts Of Japan, 03114926 A.

* cited by examiner

*Primary Examiner*—Kiran Patel
(74) *Attorney, Agent, or Firm*—Bill C. Panagos (57) ABSTRACT

A modular overhead console assembly and headliner combination for a vehicle includes a structural member having an upper surface attachable to a vehicle roof and a lower surface having a slot including at least one receiving surface formed through the structural member. At least one accessory module having a storage area defined within a housing to retain materials is removably secured to the at least one receiving surface associated with the slot in the headliner by at least one arm extending from a top surface of the housing of the at least one module. A method of assembling the overhead console and headliner combination is also provided.

25 Claims, 11 Drawing Sheets

MODULAR OVERHEAD CONSOLE ASSEMBLY

TECHNICAL FIELD

The present invention relates to an overhead console assembly for the interior of a vehicle and a method of forming a modular overhead console assembly.

BACKGROUND ART

Overhead consoles are commonly provided in the passenger compartment of a vehicle such as an automobile, boat or airplane. Overhead console assemblies are generally elongate structures disposed along the longitudinal axis of a headliner. The headliner includes an upper surface mounted to the interior roof structure of the vehicle and a lower surface having an overlay applied thereon. The overhead console is mounted to the lower surface of the headliner to provide additional storage space for items such as sunglasses, garage door openers and compact discs.

Current overhead console assemblies include a series of accessory compartments for storing items. The accessory compartments are pivotally mounted to the console to allow the passenger to stow and retrieve personal items from the compartment. Overhead consoles assemblies may also include other vehicle components, such as overhead lighting fixtures, vehicle controls for the radio and air conditioning systems, electronic components, such as compasses and temperature displays and video monitors.

One significant limitation of current overhead console assemblies is that the accessory compartments cannot be repositioned without a complete rebuild of the console. Fixed accessory compartments restrict passengers from repositioning the compartments based on driver or passenger preference. Another limitation is that stored items must be removed from the accessory compartments to transport the items between the vehicle and another location. It would be advantageous to provide an overhead console assembly for a vehicle having modular accessory compartments easily positionable on the headliner of the vehicle.

DISCLOSURE OF INVENTION

The present invention overcomes the above-referenced problems associated with prior overhead console assemblies by providing a modular overhead console assembly and a method of assembling a modular overhead console for a vehicle. The modular overhead console assembly includes a headliner comprising a structural member having an upper surface attached to the vehicle roof and a lower surface. An elongated slot is formed in and extending through the structural member of the headliner between the upper and lower surfaces.

At least one receiving surface is associated with the slot in the headliner to receive and secure at least one accessory module. In one embodiment of the invention, the at least one receiving surface comprises a track mounted to the headliner through the slot having an outer surface, a channel formed through a lower surface of the track and an inner surface having a pair of opposing members formed therein to receive the at least one accessory module. At least one retaining clip engages a pair of ribs formed on opposing sides of the outer surface of the track to secure the track to the upper surface of the structural member of the headliner.

At least one accessory module is removably attached to the at least one receiving surface in the headliner at different locations along the length of the slot. The at least one accessory module includes a housing having a top surface, a bottom surface and a storage area defined within the housing to retain materials. At least one arm extends upward from the top surface of the housing to selectively engage the at least one accessory module with the at least one receiving surface of the headliner. In one embodiment of the invention, a pair of opposing arms extend from a rear portion of the top surface of the housing and a corresponding hook extends from a front portion of the housing to engage an adjacent pair of opposing arms of another accessory module or end cap. A trim cap is removably secured to the at least one receiving surface to cover the slot in the headliner.

A method of assembling an overhead console assembly and headliner combination to a vehicle roof comprises providing a nesting tool having an upper surface shaped to receive a lower surface of the headliner and positioning components such as a track in the nesting tool to be assembled in the slot in the headliner. A headliner having a slot formed in and extending through the structural member is laid on the nesting tool to allow the outer surface of the track to be inserted through and secured adjacent the slot in the headliner. At least one accessory module is secured to the track in the headliner to complete assembly of the modular overhead console.

The above objects and other objects, features and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
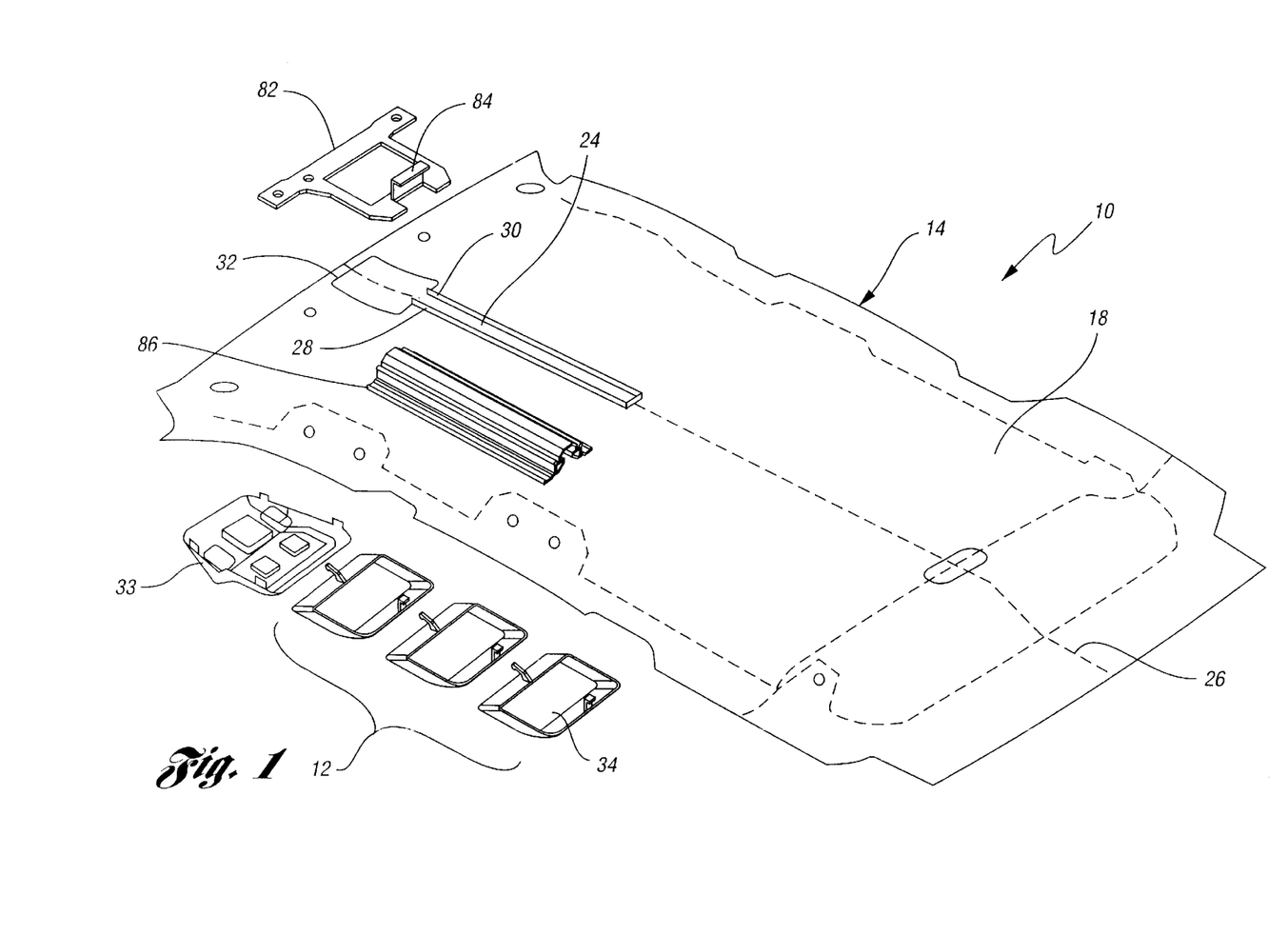
FIG. 1 is an exploded perspective view of a first embodiment of the modular overhead console assembly of the present invention.
Figure 2:
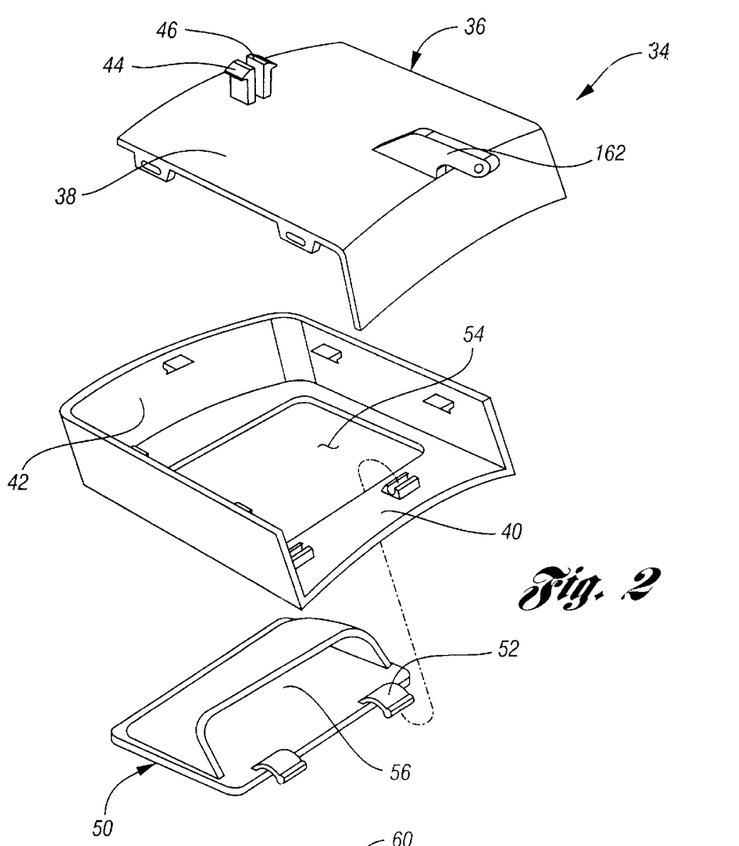
FIG. 2 is an exploded perspective view of an accessory module of the modular overhead console assembly of the present invention.
Figure 3:
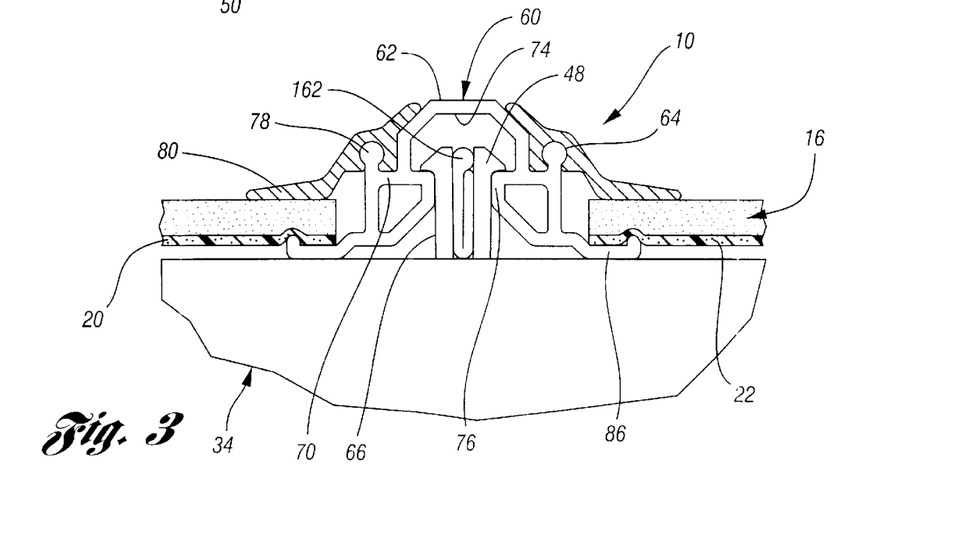
FIG. 3 is a front elevational view of the first embodiment of the modular overhead console assembly.

Referring now to the Figures, a modular overhead console assembly 10 of the present invention is disclosed. FIGS. 1–3 illustrate a first embodiment of the invention. Modular overhead console assembly 10 includes an overhead console assembly, generally referenced by numeral 12, removably secured to a headliner 14. Headliner 14 comprises a structural member 16 having an upper surface 18 attached to the frame of a vehicle roof (not shown) and a lower surface 20. Structural member 16 is generally formed as a one-piece structure which extends above the passenger compartment of a vehicle. The lower surface 20 of structural member 16 is typically covered by an overlay 22, such as a polymeric material or fabric.

An elongated slot 24 is formed in headliner 14 and extends through the structural member 16 between the upper surface 18 and lower surface 20. Slot 24 generally extends along the longitudinal axis 26 of headliner 14 and forms a pair of opposing side surfaces 28, 30 in the structural member 16. An opening 32 is formed adjacent the front edge of slot 24 to receive overhead vehicle components 33, such as lighting fixtures or electronic displays. It is understood that slot 24 may be formed in the structural member 16 at a variety of positions or orientations to accomplish a similar result.

Referring now to FIG. 2, the accessory module 34 of the modular overhead console assembly 10 are discussed in greater detail. One or more accessory modules 34 may be incorporated in the modular overhead console assembly 10. The accessory module 34 comprises a module housing 36 having an top surface 38, a bottom surface 40 and a storage area 42 defined therebetween. At least one arm 44 extends upward from the top surface 38 of the housing 36. In a preferred embodiment of the invention, a pair of opposing arms 44, 46 are formed on the rear portion of the top surface 38 of housing 36. Each arm 44, 46 includes a projection 48 extending from an upper portion of the arm to engage at least one receiving surface.

Accessory modules 34 can be configured to store a variety of materials within storage area 42. As is shown in FIG. 2, module 34 is configured to hold a pair of sunglasses or the like. A door 50 is pivotally mounted to the bottom surface 40 of housing 36 by hinges 52. Door 50 extends between an open position generally perpendicular to the bottom surface 40 of housing 36 and a closed position wherein door 50 is received in aperture 54. A storage pocket 56 is formed on door 50 to retain sunglasses or the like. It is understood that the configuration of the bottom surface 40 of housing 36 of accessory module 34 may be modified to store other materials within storage area 42, such as tissue boxes, compact discs or garage door openers.

At least one receiving surface is associated with the elongated slot 24 in the headliner 14 to removably attach accessory modules 34 to headliner 14 at different locations along the length of the slot. In a preferred embodiment of the invention, the at least one receiving surface comprises a track 60 cooperates with slot 24 to receive and secure accessory modules 34 in position. Track 60 includes an outer surface 62 having ribs 64 formed on opposing sides of the outer surface 62. A channel 66 is formed through a lower portion 68 of the outer surface 62 of track 60. Channel 66 extends below the lower surface 20 of headliner 14.

A pair of receiving members 70, 72 are formed on opposing sides of an inner surface 74 of the track 60. Receiving members 70, 72 cooperate with channel 66 to receive and secure the pair of opposing arms 44, 46 extending from the top surface 38 of accessory module 34. In an alternative embodiment of the invention, the at least one receiving surface comprises a pair of opposed receiving members integrally formed into the opposing side surfaces 28, 30 of slot 24. The opposed receiving members secure the opposing arms 44, 46 of accessory modules 34 directly to the headliner 14, thereby eliminating the need for track 60.

Track 60 is secured to the headliner 14 by at least one retaining clip 76. In the preferred embodiment of the invention, retaining clip 76 includes a pair of channels 78 adapted to receive and engage ribs 64 on opposing sides of track 60. Each end of clip 76 terminates at an end portion 80 which engages the upper surface 18 of structural member 16 to secure the track 60 in the slot 24 of headliner 14. Retaining bracket 82 mounts overhead lighting fixtures in opening 32 and includes a projection 84 which engages a front portion of track 60. Once positioned in headliner 14, channel 66 of track 60 extends below the lower surface 20 of headliner 14 to receive accessory modules 34. A lip 86 extends from the lower portion 68 of track 60 from channel 66 to engage the lower surface of headliner 14 and cover slot 24.

Figure 4:
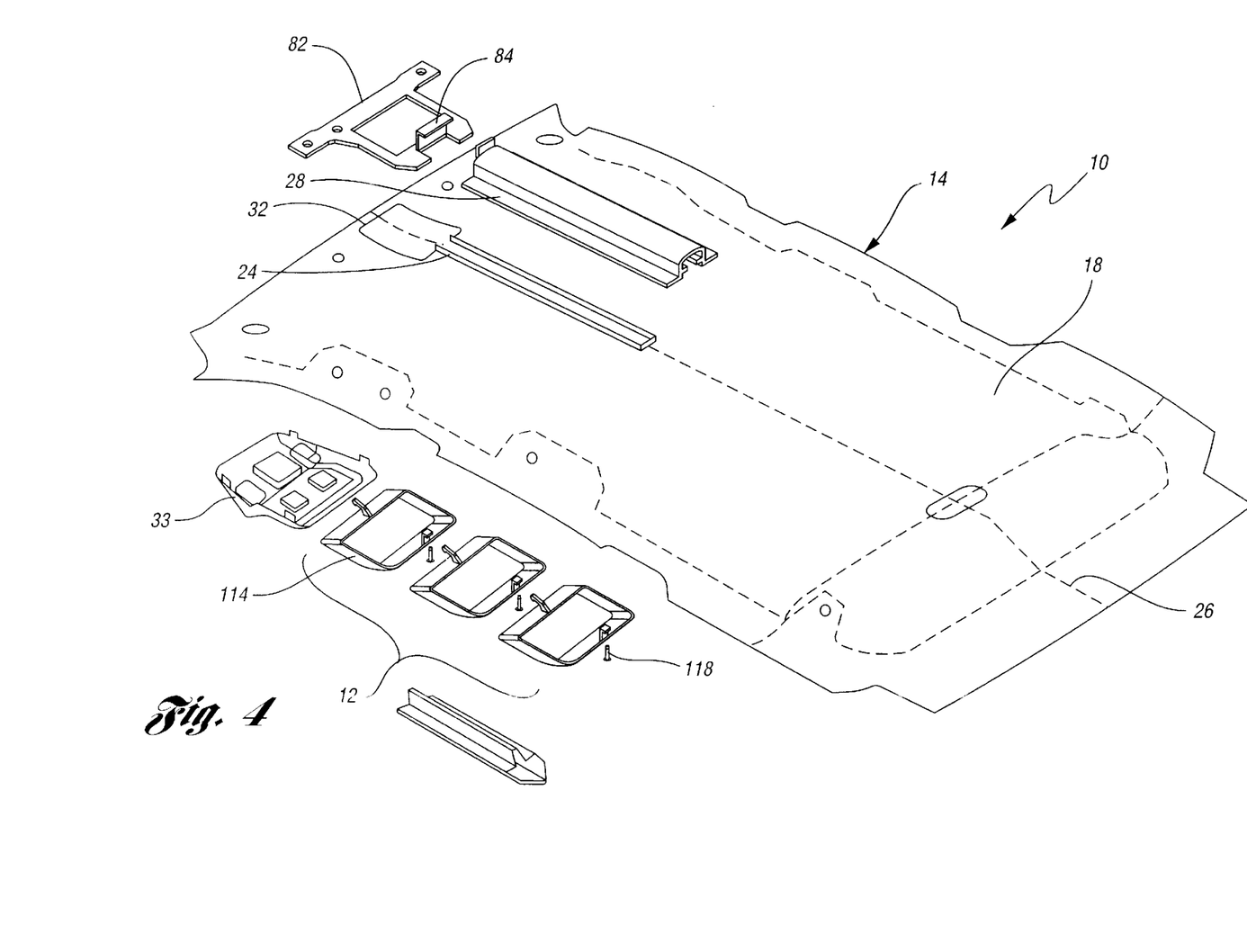
FIG. 4 is an exploded perspective view of a second embodiment of the modular overhead console assembly of the present invention.
Figure 5:
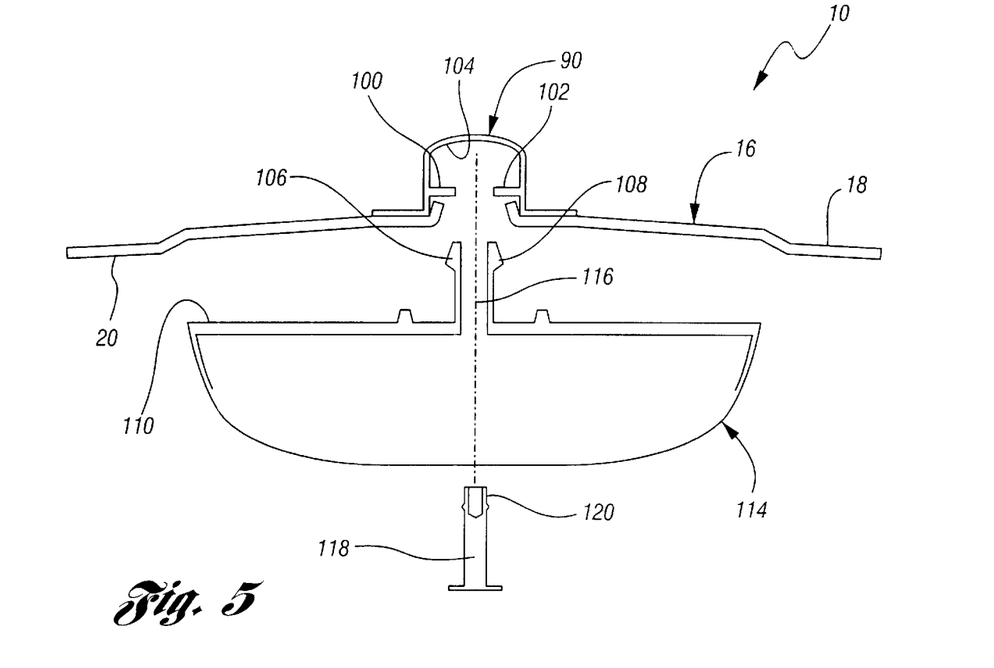
FIG. 5 is a front elevational view of the second embodiment of the modular overhead console assembly prior to attachment of the accessory module.
Figure 6:
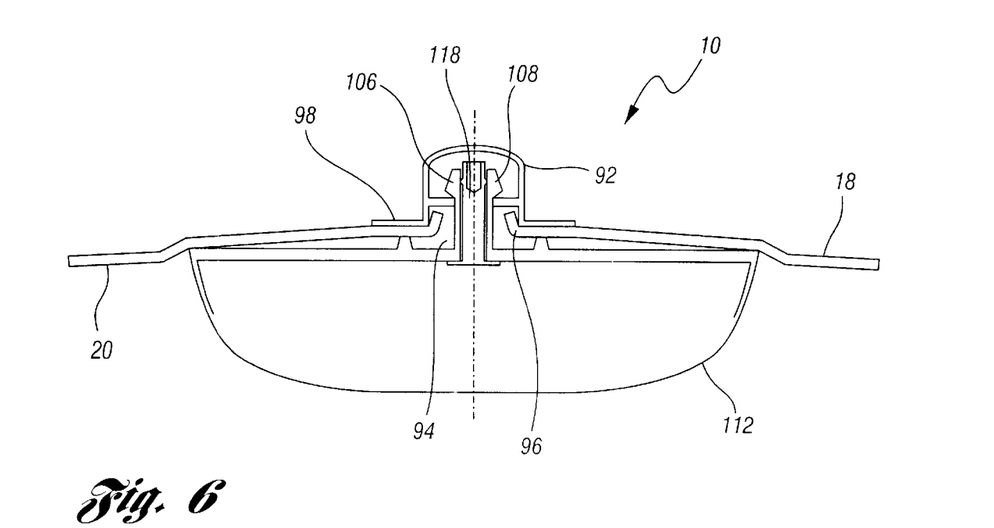
FIG. 6 is a front elevational view of the second embodiment of the modular overhead console assembly.

Referring now to FIGS. 4–6, a second embodiment of the modular overhead console assembly 10 is described in greater detail. Similar numerals are used to describe common features of the modular overhead console assembly. In the second embodiment of the invention, a track 90 is mounted adjacent slot 24 along the upper surface 18 of headliner 14. Track 90 includes an outer surface 92, a channel 94 formed in a lower portion 96 and lips 98 extending generally horizontally from the channel opening 94. Lip portions 98 are secured to the upper surface 18 of headliner 14 to align channel 94 with slot 24.

A pair of receiving members 100, 102 are formed on opposing sides of an inner surface 104 of the track 90. Receiving members 100, 102 engage a pair of opposing arms 106, 108 extending from a top surface 110 of accessory module housing 112. Accessory module 114 includes an aperture 116 formed in the top surface 110 of the housing 112 which receives a locking pin 118. An upper end 120 of locking pin 118 cooperates with opposing arms 106, 108 to lock arms 106, 108 in position above the receiving members 100, 102 of track 90.

Figure 7:
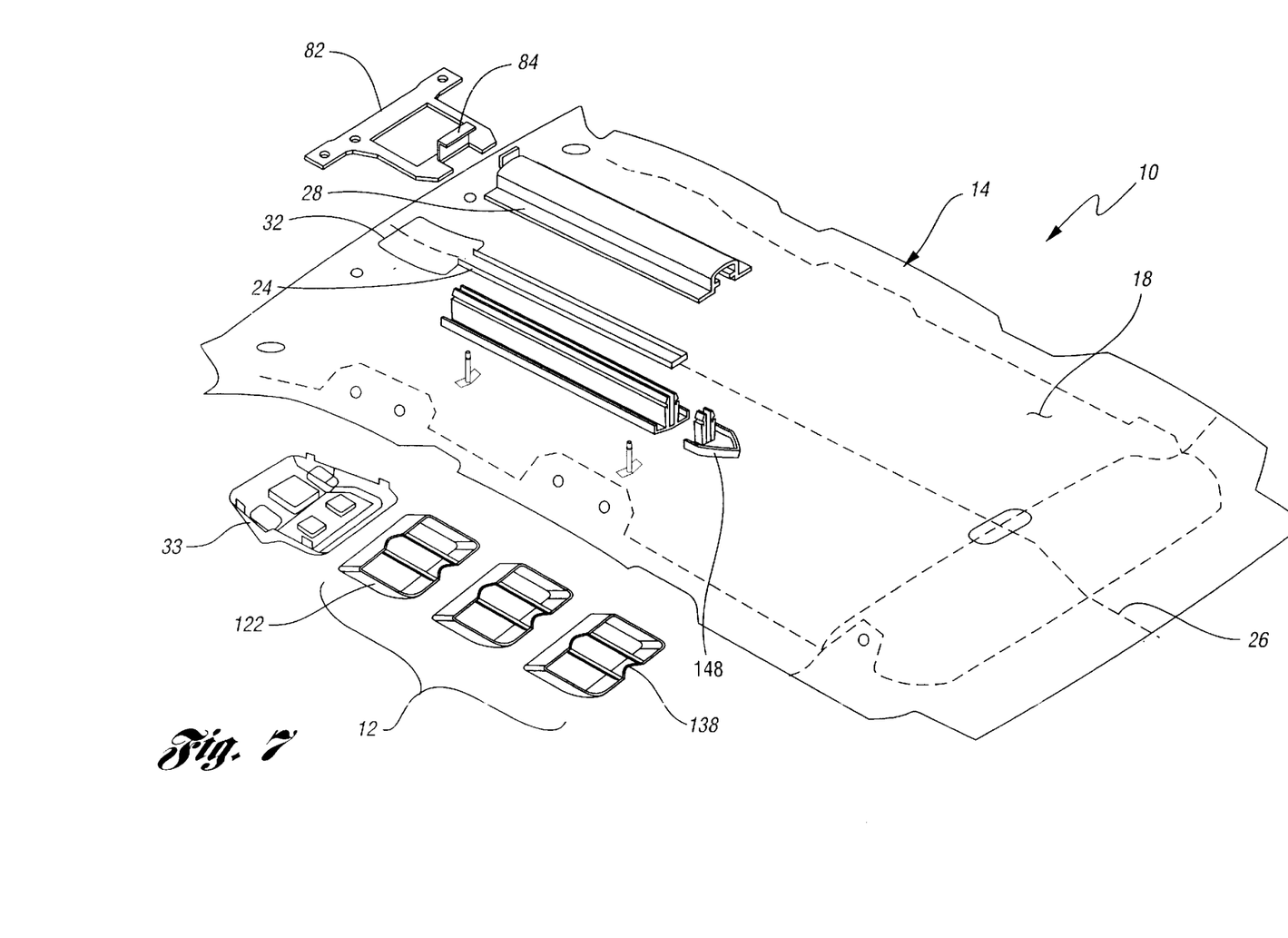
FIG. 7 is an exploded perspective view of a third embodiment of the modular overhead console assembly of the present invention.
Figure 8:
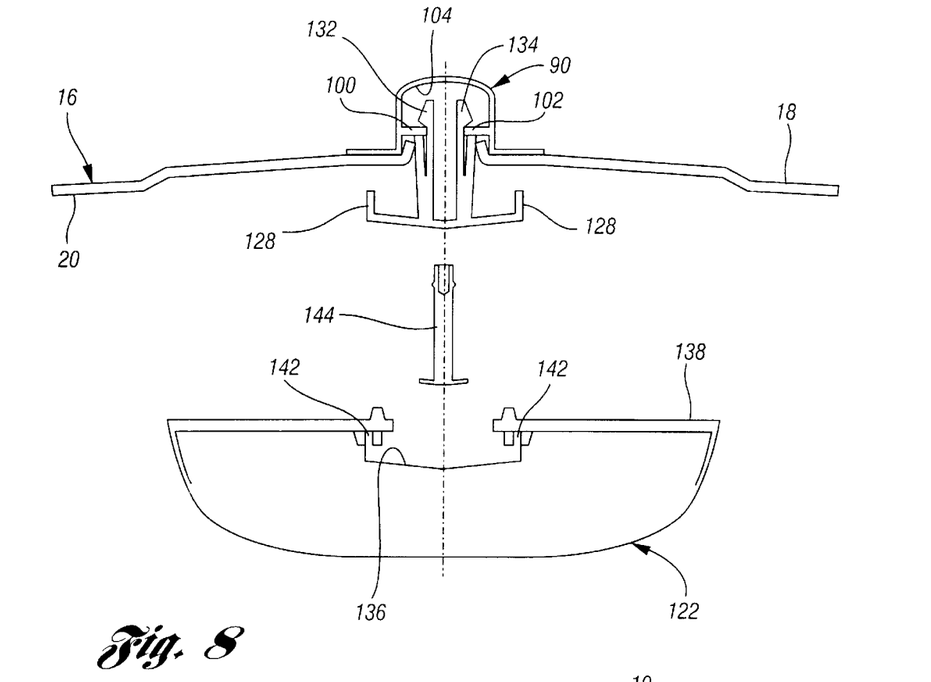
FIG. 8 is a front elevational view of the third embodiment of the modular overhead console assembly prior to attachment of the accessory module.
Figure 9:
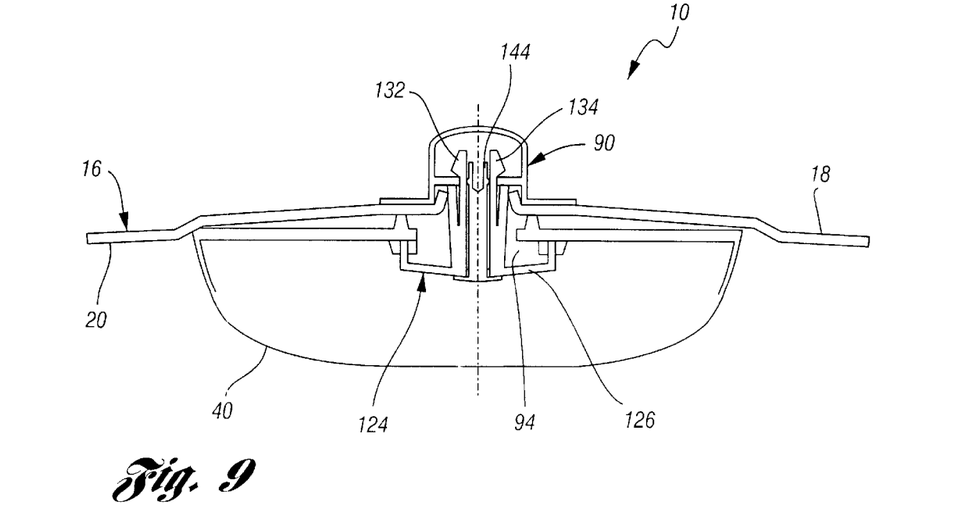
FIG. 9 is a front elevational view of the third embodiment of the modular overhead console assembly.
Figure 10:
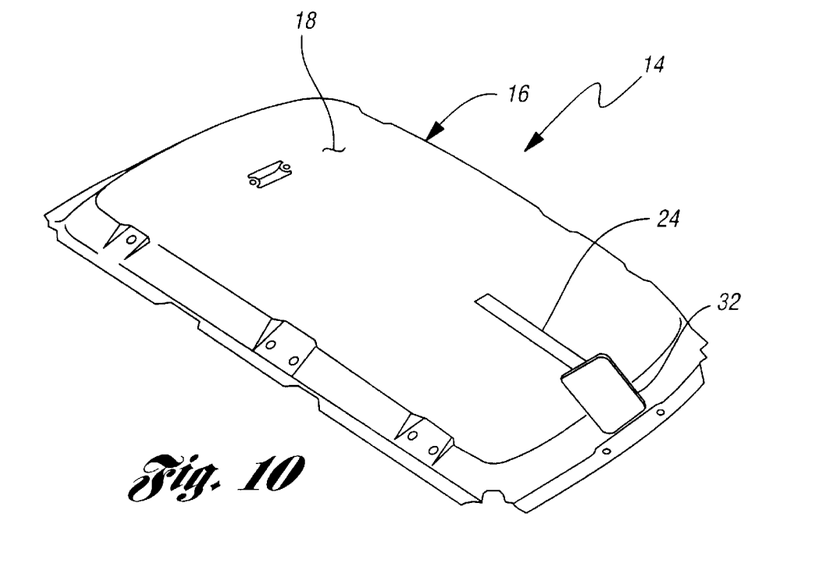
FIG. 10 is a perspective view of the headliner of the modular overhead console assembly of the present invention.
Figure 11:
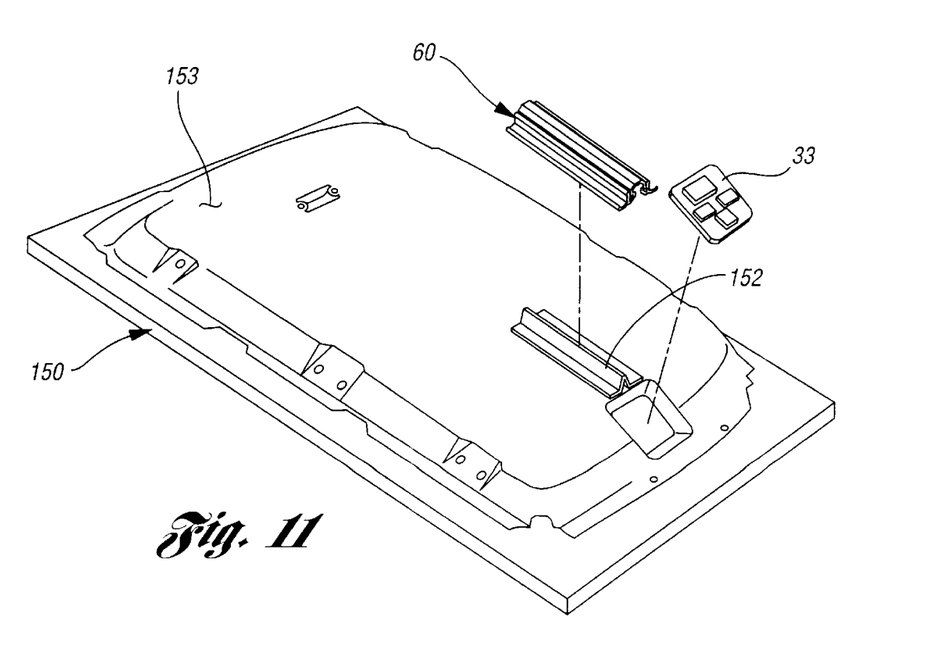
FIG. 11 is a perspective view of a track and nesting tool used in the forming of the modular overhead console assembly.
Figure 12:
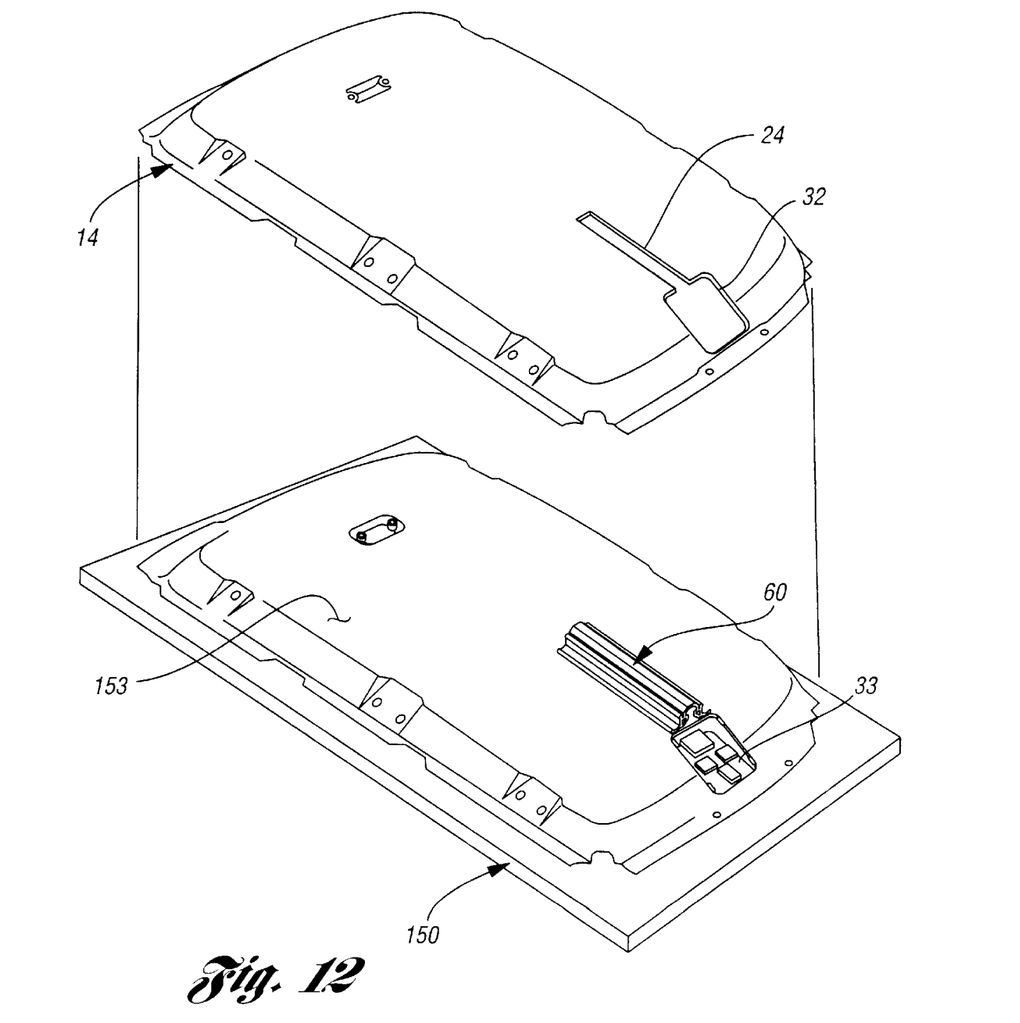
FIG. 12 is an exploded perspective view of the nesting tool and track prior to assembly on the headliner.
Figure 13:
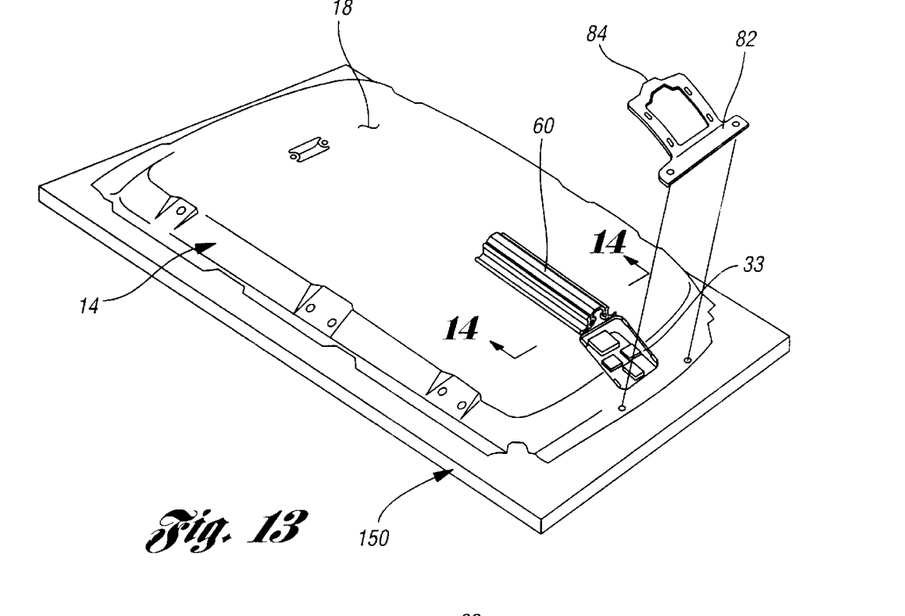
FIG. 13 is a perspective view of the headliner of the modular overhead console assembly seated on the nesting tool prior to assembly of the track retainer.
Figure 14:
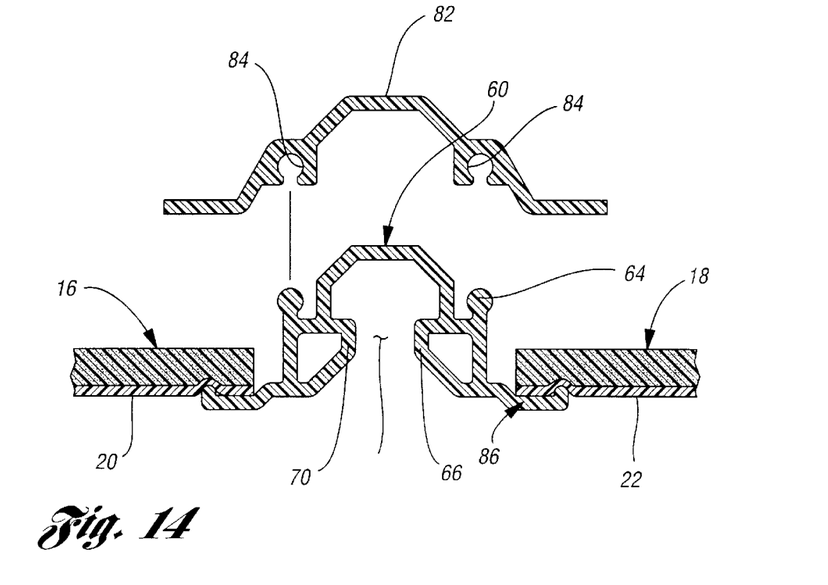
FIG. 14 is a cross-sectional view along line 14—14 of FIG. 13 of the the track mounted to the headliner of the modular overhead console assembly of the present invention.
Figure 15:
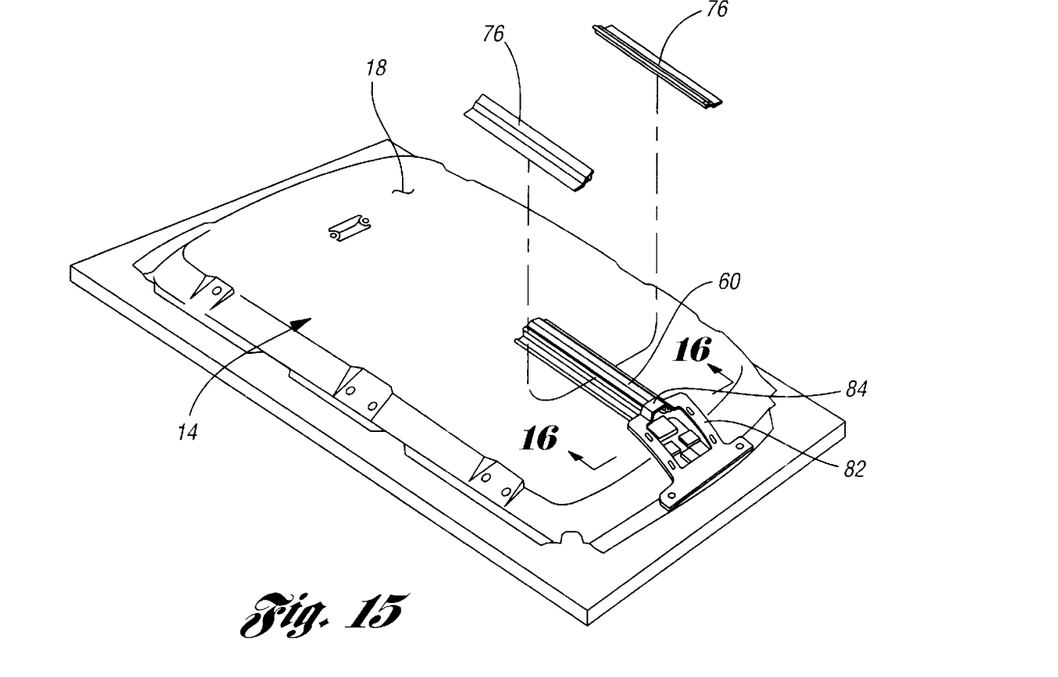
FIG. 15 is a perspective view of the modular overhead console assembly prior to assembly of the track retainer clips to the headliner.
Figure 16:
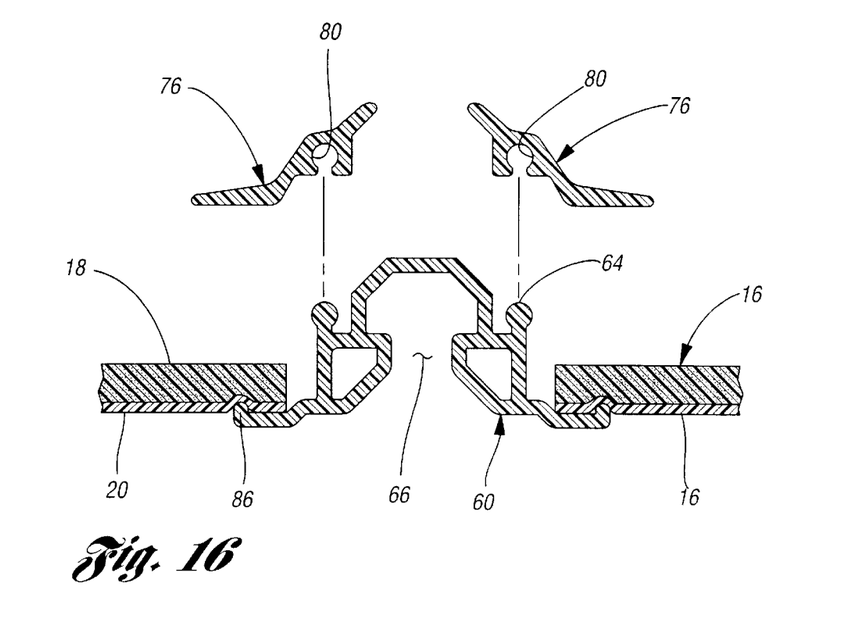
FIG. 16 is a cross-sectional view along line 16—16 of FIG. 15 of the track retainer clips prior to assembly on the track and headliner of the modular overhead console assembly of the present invention.

Referring now to FIGS. 7–9, a third embodiment of the modular overhead console assembly 10 is described in greater detail. Similar numerals are used to describe common features of the modular overhead console assembly. In the third embodiment of the invention, accessory modules 122 are slidably mounted to a secondary rail 124. Secondary rail 124 comprises a generally horizontal lower portion 126 having a pair of guides 128 extending upward at each end and an upper portion 130 terminating at a pair of opposing arms 132, 134. Opposing arms 132, 134 engage a pair of receiving members 100, 102 formed on opposing sides of the inner surface 104 of track 90.

Accessory modules 122 include a passage 136 formed in a top surface 138 of accessory module housing 140. Each passage 136 includes a pair of channels 142 adapted to engage guides 128 on secondary rails 124. To mount accessory modules 122 adjacent headliner 14, the secondary rail 124 is inserted into passage 136 on module 124 to align guides 128 with channels 142. Once the module 122 is positioned on the secondary rail 124, a locking pin 144 is inserted through an aperture 146 in the top surface 138 of the housing 140 through a corresponding passage (not shown) in the secondary rail 124. The locking pin 144 cooperates with secondary rail 124 to secure the accessory module 122 adjacent headliner 14. A trim cap 148 may also be mounted to track 90 to cover slot 24. It should be understood that accessory modules 34, 114 and 122 and trim cap 148 are interchangeably used with either track 60 or track 90.

Referring now to FIGS. 10–19, a description of the method of assembling the first embodiment of the modular overhead console assembly is discussed in greater detail. A headliner 14 is provided having a slot 24 extending through the structural member 16 of headliner 14. A nesting tool 150 is provided having an upper surface 153 shaped to the contour of the lower surface 20 of headliner 14. Nesting tool 150 includes a passage 152 formed in the upper surface 153 which corresponds to the slot 24 formed in the headliner 14. A track 60 and any overhead components 33 to be mounted in either slot 24 or opening 32 in headliner 14 are placed in the passage 152 for assembly.

As is shown in FIGS. 12–16, headliner 14 is lowered into position on nesting tool 150 to mount the track 60 to headliner 14. Track 60 extends through slot 24 to the upper surface 18 of structural member 16. Retaining bracket 82 is placed on the upper surface 18 of headliner 14 to mount any overhead components 33 in opening 32. Additionally, projection 84 on bracket 82 engages ribs 64 on the opposing sides of outer surface 62 of track 60. The projection 84 provides an initial securing surface for track 60 in slot 24. At least one retaining clip 76 is then secured to ribs 64 on track 60 to mount the track 60 in position on headliner 14. The headliner 14 with mounted track 60 is removed from nesting tool 150 to secure the upper surface 18 of headliner 14 to a vehicle roof (not shown).

Figure 17:
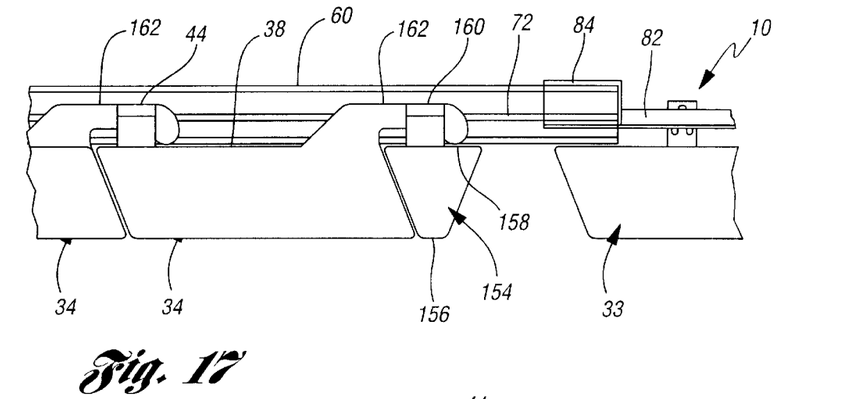
FIG. 17 is a side elevational view of the accessory modules of the present invention attached to the end cap of the modular overhead console assembly.
Figure 18:
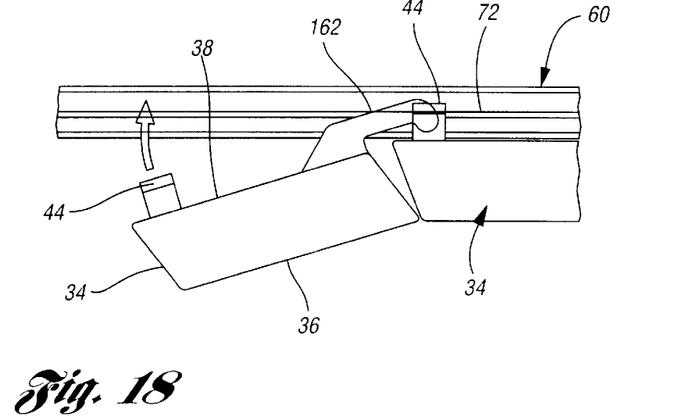
FIG. 18 is a side elevational view of an accessory module prior to assembly of the module on the track of the modular overhead console assembly of the present invention.
Figure 19:
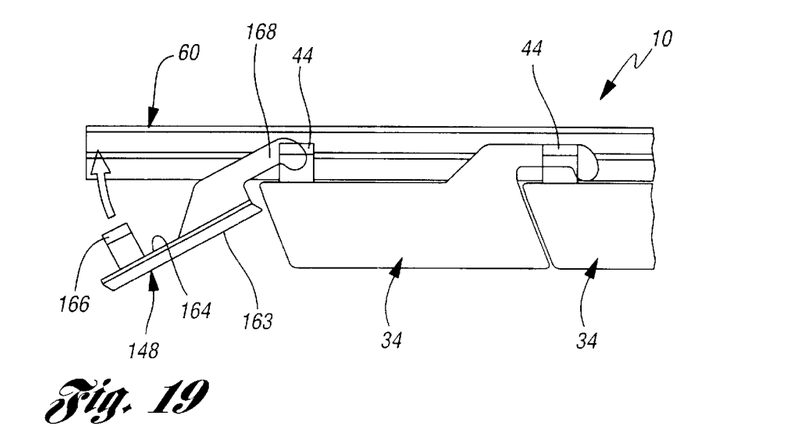
FIG. 19 is a side elevational view of the end cap of the modular overhead console assembly prior to assembly to the track.

FIGS. 17–19 display a method of assembling the accessory modules to the track 60 in headliner 14 to complete the modular overhead console assembly. As is shown in FIG. 17, an end cap 154 is inserted into the channel 66 of track 60 adjacent a front portion of the headliner 14. End cap 154 includes a lower decorative surface 156 and an upper surface 158 having a pair of opposing arms 160 which are supported by the pair of receiving members 70, 72 formed on opposing sides of an inner surface 74 of the track 60. End cap 154 provides a support surface for additional accessory modules to be mounted in track 60 if the accessory module 34 is to be mounted as a stand alone module. Otherwise, the accessory module can mount directly to the housing of overhead vehicle components 33 mounted in opening 32.

Accessory modules 34 are then mounted in track 60. Track 60 can support one or more accessory modules 34. The opposing arms 44, 46 extending from the top surface 38 of accessory module 34 are inserted through channel 66 in track 60 and are supported by receiving members 70, 72 of track 60. In the preferred embodiment of the invention, arms 44, 46 are provided adjacent the rear end of module 34 and a hook 162 extends from a front portion of the top surface 38 of accessory module housing 40. If the module is the first module to be installed in the track 60, hook 162 of module 34 extends through and engages the opposing arms 160 of end cap 154 to secure the module 34 in position. Alternatively, hook 162 extends through and engages opposing arms 44, 46 of an adjacent module 34 to support the front portion of module 34 in track 60. It is understood that a variety of other mounting arrangements may also be used. For example, opposing arms may be provided on the front and rear portions of the upper surface of the accessory module housing. Alternatively, mounting arrangements described in the second and third embodiments of the modular overhead console assembly described above may also be used.

Referring now to FIG. 19, a trim cap 148 is provided to cover slot 24 in headliner 14. Trim cap 148 is used if the number of accessory modules 34 mounted in track 60 is less than the length of the track and slot 24 exposed in the headliner 14. Trim cap 148 includes a lower decorative surface 163 extending generally horizontally and parallel to the slot 24 in headliner. Upper surface 164 of trim cap 148 includes a pair of opposing arms 166 which engage receiving members 70, 72 of track 60. A hook 168 extending from a front portion of the upper surface 164 of the trim cap 148 engages the opposing arms 44, 46 of an adjacent accessory module 34 to support the front end of trim cap 148.

While the best mode for carrying out the invention has been described in detail, those familiar with the art to which this invention relates will recognize various alternative designs and embodiments for practicing the invention within the scope of the appended claims.

What is claimed is:

1. An overhead console assembly and headliner combination for use with a vehicle, the combination comprising:

a headliner comprising a structural member having an upper surface attachable to a vehicle roof and a lower surface;

an elongated slot formed through the structural member of the headliner;

at least one receiving surface associated with the slot in the headliner; and at least one accessory module removably attachable to the at least one receiving surface of the headliner at different locations along the length of the slot, the at least one accessory module including a housing, a storage area defined within the housing to retain materials and at least one arm extending from a top surface of the housing to selectively engage the at least one accessory module to the at least one receiving surface of the headliner.

2. The combination of claim 1 wherein the at least one receiving surface further comprises a pair of opposed receiving surfaces cooperating with the slot formed in the structural member of the headliner to receive the at least one accessory module.

3. The combination of claim 2 wherein the pair of opposed receiving surfaces are integrally formed into the slot of the structural member of the headliner.

4. The combination of claim 1 wherein the at least one receiving surface further comprises a track mounted adjacent the slot, the track including an outer surface, a channel formed through the outer surface and an inner surface cooperating with the channel, wherein a pair of opposing members are formed on the inner surface of the track to receive the at least one arm of the at least one accessory module.

5. The combination of claim 4 wherein the track further comprises at least one retaining clip engaging a pair of opposing ribs formed on the outer surface of the track to secure the track to the upper surface of the structural member of the headliner.

6. The combination of claim 5 wherein the channel of the track extends below the lower surface of the structural member of the headliner.

7. The combination of claim 4 wherein the outer surface of the track further comprises a lip extending generally horizontally from the channel secured to the upper surface of the structural member of the headliner to mount the channel of the track above the slot in the upper surface of the headliner.

8. The combination of claim 1 wherein the at least one accessory module further comprises a pair of opposing arms extending upward from the top surface of the housing adapted to engage the at least one receiving surface in the headliner.

9. The combination of claim 8 wherein a locking pin extends through a hole in the top surface of the housing between the pair of opposing arms to secure the at least one module to the at least one receiving surface of the headliner.

10. The combination of claim 1 wherein the at least one accessory module further comprises at least one arm having a lower end slidably mounted to a channel formed in the top surface of the housing and an upper end removably secured to the at least one receiving surface in the headliner.

11. The combination of claim 10 wherein a locking pin extends through a hole in the top surface of the housing and the at least one arm to secure the at least one module to the at least one arm.

12. The combination of claim 1 wherein the at least one accessory module includes a hook extending from a front portion of the top surface of the housing to secure the at least one module to an adjacent surface.

13. An overhead console assembly and headliner combination for use with a vehicle, the combination comprising:
    a headliner comprising a structural member having an upper surface attachable to a vehicle roof and a lower surface;
    an elongated slot formed through the structural member of the headliner;
    a track mounted adjacent to and associated with the slot in the headliner, the track including an outer surface having a rib formed on opposing side surfaces, a channel formed through a lower surface of the track extending below the lower surface of the headliner and an inner surface cooperating with the channel having a pair of opposing members formed therein;
    at least one retaining clip engaging the pair of opposing ribs to secure the track to the headliner; and
    at least one accessory module removably secured to the track disposed in the slot of the headliner, the at least one accessory module including a housing, a storage area defined within the housing to retain materials and a pair of opposing arms extending from a top surface of the housing to removably engage the pair of opposing members in the channel of the track to selectively engage the at least one accessory module adjacent the headliner.

14. The combination of claim 13 wherein the at least one accessory module comprises a plurality of accessory modules mounted adjacent one another on the track.

15. The combination of claim 14 wherein a hook is formed on a front portion of the top surface of the housing of the at least one accessory module to secure the at least one module to an adjacent surface.

16. The combination of claim 13 further comprising a cap selectively positionable on the track, wherein the cap includes a housing having a lower decorative surface and an upper surface having a pair of opposing arms extending upward to removably engage the pair of opposing members in the channel of the track.

17. The combination of claim 16 wherein the cap comprises a trim cap adapted to cover the slot in the headliner.

18. The combination of claim 16 wherein the cap comprises an end cap adapted to receive the hook of an adjacent accessory module.

19. The combination of claim 15 wherein the hook of a first accessory module extends through the pair of opposing arms on the top surface of an adjacent second accessory module to secure the first module to the second module.

20. A method of assembling an overhead console assembly and headliner combination, the method comprising:
    providing a headliner having a structural member including a slot formed through the structural member;
    providing a nesting tool having an upper surface shaped to receive a lower surface of the structural member;
    positioning a track in a passage formed in the upper surface of the nesting tool;
    positioning the lower surface of the structural member on the upper surface of the nesting tool;
    inserting the outer surface of the track through the slot in the structural member of the headliner to position the track adjacent the slot in the headliner;
    securing the track to the structural member of the headliner;
    mounting an upper surface of the structural member of the headliner to a vehicle roof;
    providing at least one accessory module having a housing, a storage area defined within the housing and a pair of opposing arms extending from a top surface of the housing; and
    securing the opposing arms of the module through a channel cooperating with the track to a pair of opposing members formed on the inner surface of the track.

21. The method of claim 20 further comprising securing a rib formed on opposing side surfaces of the track with at least one retaining clip to mount the track to the upper surface of the structural member of the headliner.

22. The method of claim 20 further comprising securing the channel of the track below the lower surface of the headliner.

23. The method of claim 20 further comprising securing the channel of the track above the upper surface of the headliner.

24. The method of claim 20 further comprising mounting an end cap having a housing including a lower decorative surface and an upper surface having a pair of opposing arms extending upward to the pair of opposing members in the channel of the track.

25. The method of claim 20 further comprising mounting a trim cap having a housing including a lower decorative surface and an upper surface having a pair of opposing arms extending upward to the pair of opposing members in the channel of the track.

* * * * *